3,157,337
HELICALLY WOUND FLUID-TIGHT CONTAINER
William Binford Elam, Oakland, N.J., assignor to American Can Company, New York, N.Y., a corporation of New Jersey
Filed Dec. 20, 1961, Ser. No. 160,725
1 Claim. (Cl. 229—4.5)

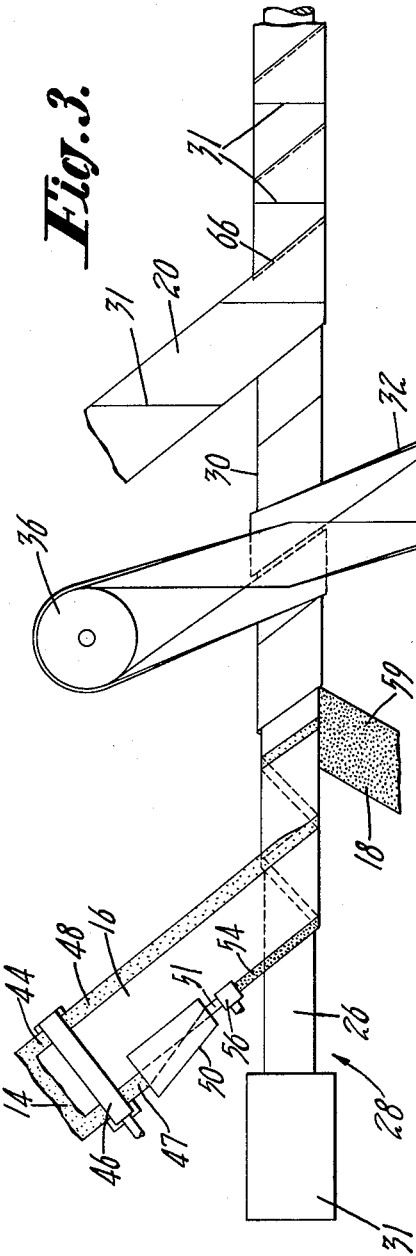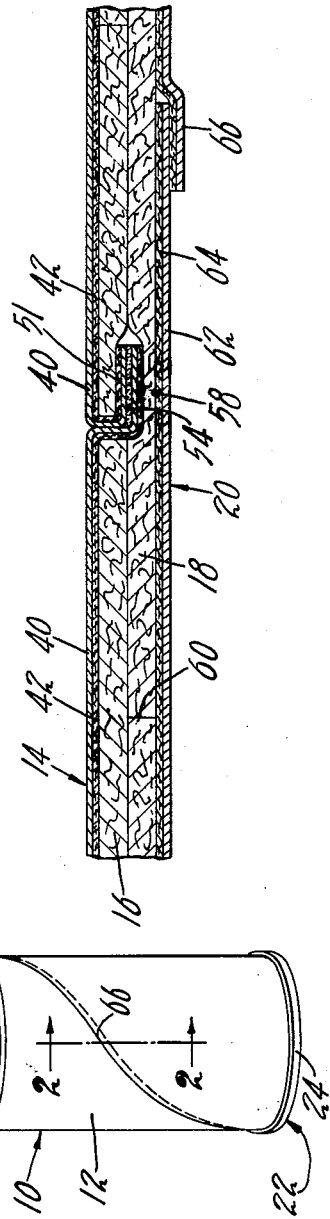

The present invention relates to spirally wound container bodies, and has particular reference to providing such bodies with an impervious liner having its edges glued together in a fluid-tight interior lap seam joint.

There is at the present time a great deal of interest in the development of spirally wound fibre bodied containers for use in the packaging of many products which need not be heat processed while in the containers. Many such products comprise or contain fluids such as oil, grease, water or moisture and it is desirable to line such bodies with a barrier which will prevent these fluids from coming into contact with the main fibre body plies.

Aluminum foil provides a very satisfactory inner liner for such containers, since it is impervious to these fluids. However, in order to maintain the cost of the body at a minimum, it is desirable to use aluminum foil having a thickness of less than .0005 inch. Such foil is weak and very susceptible to tearing, and it is not practical to spirally wind it on presently available equipment unless it is prelaminated to a strong backing material. The most suitable and commonly used backing material is kraft paper which, unfortunately, is not impervious to these fluids. As a consequence, when the kraft backed aluminum foil liner is spirally wound in the usual manner with its edges overlapped or abutted, at least one edge of the kraft is exposed to the product, thus permitting the fluids therein to wick into the kraft behind the aluminum foil and eventually reach the fibre body plies and deleteriously saturate them.

The present invention overcomes this problem by providing a method of forming a spirally wound container body wherein the helical edge portions of the kraft-backed aluminum foil liner are offset behind the inner main body ply and formed into a lap seam wherein the aluminum foil edges of the successive liner convolutions are disposed in face to face engagement and sealed together with an adhesive which is impervious to the fluid within the container. The resultant product is a container body wherein the kraft backing is completely shielded from the product so that wicking of the latter into the fibrous body plies is completely eliminated.

An object of the present invention therefore is the provision of a method of providing a helically wound container body with a helically wound paper backed foil liner having its helical edges formed into an adhesively sealed fluid-tight seam so that its paper backing is shielded from the interior of the body.

Another object is the provision of a container body which can be formed by the instant method invention at low cost on presently available spiral winding equipment.

Numerous other objects and advantages of the invention will be apparent as it is better understood from the following description, which, taken in connection with the accompanying drawings, discloses a preferred embodiment thereof.

Referring to the drawings:
FIG. 1 is a perspective view of a sealed container having a spirally wound, lined fibre body embodying the instant product invention;

FIG. 2 is a section, on an enlarged scale, through the body of the container of FIG. 1, the view being taken substantially along the line 2—2 of FIG. 1;

FIG. 3 is a schematic view illustrating the instant method invention as practiced on a spiral winding machine.

As a preferred and exemplary embodiment of the instant invention, FIG. 1 discloses a sealed container 10 which is adapted to hold a fluid or fluid-containing product, such as motor oil, biscuit dough, or the like. The container 10 is formed with a spirally wound body 12 which, in the illustrated embodiment of the invention, comprises four plies, these being a liner ply 14, an inner main body ply 16, an outer main body ply 18, and a label ply 20. It will be realized, of course, that the number and thicknesses of the plies can be varied to meet the particular requirements of any given product or package. The ends of the body 12 are sealed by means of a pair of countersunk end members 22 (see FIG. 2) which are secured thereto in leakproof end seams 24 of any suitable configuration.

In manufacturing the body 12, the various body plies 14, 16, 18, 20 are helically wound around the stationary mandrel 26 of a spiral winding machine, generally designated by the numeral 28, to form them into a helically wound tube 30 which is subsequently severed into uniform lengths along lines of severance 31, which may be preprinted on the label ply 20, to form individual bodies 12.

One end of the mandrel 26 is fixedly mounted in a block 31 which forms a part of the main frame of the winding machine 28, the opposite end of the mandrel 26 being free in order to permit discharge of the tube 30. The spiral winding machine 28 also includes a constantly moving endless belt 32 which operates around a driving drum 36 and an idler drum 38 and is wrapped around the mandrel 26 in tight driving engagement with the tube 30. As a result, the belt 32 moves the tube 30 helically along the mandrel 26, thus pulling the plies 14, 16, 18 and 20 from their supply rolls (not shown) which are mounted laterally along the mandrel 26 in spaced relation thereto.

The liner ply 14, as seen in FIG. 2, comprises an inner layer 40 of thin impervious aluminum foil which is prelaminated to a supporting layer 42 of a suitable, strong, fibrous backing such as kraft paper. This prelaminated liner ply is readily available from commercial sources and has been commonly used in the manufacture of spirally wound can bodies. As best seen in FIG. 3, the liner ply 14 is somewhat wider than the inner body ply 16.

In forming the container bodies 12 by utilizing the steps of the instant method invention, the liner ply 14 is first laminated to the inner body ply 16 prior to the time these plies 14, 16 are wound around the stationary mandrel 26, preferably as they approach the mandrel. To effect this laminating step, the exposed surface of the liner layer 42 is coated with a suitable adhesive 44, and the liner ply 14 is then brought into centered registration with the body ply 16 and the two plies 14, 16 are passed between a pair of pressure rolls 46 which press them firmly together. Because of the extra width of the liner ply 14, its trailing and leading marginal edge portions 47, 48 respectively, extend outwardly beyond the corresponding edges of the inner body ply 16.

After completion of this laminating step, the trailing edge portions of the combined plies 14, 16 are passed through a plow or folder unit 50 which is provided with a suitably shaped cam surface which bends the marginal edge portion 47 of the liner ply 14 across the trailing edge of the inner body ply 16 and then folds it backwardly upon itself into intimate face to face engagement with the outer surface of the body ply 16 to form a hem 51. Next, an impervious adhesive 54 is applied to the outer surface of the folded back hem 51 by an adhesive applying roller 56. The adhesive 54 may be of any type which is capable of adhering aluminum foil to aluminum foil and which is impervious to the fluid product which is to be packed in the finished container 10, and preferably is a thermoplastic or pressure sensitive adhesive. One such adhesive is the thermoplastic polyamide resin adhesive disclosed in U.S. Patent 2,840,264 issued to James H. Groves. Among other types of adhesives which are suitable are those comprising copolymers of vinyl chloride and vinyl acetate, either alone or in admixture with maleic anhydride or vinyl alcohol modified vinyl chloride-vinyl acetate copolymers.

The combined plies 14, 16 are then helically wound around the mandrel 26 in such manner as to bring the inner surface of the foil layer 40 into surface engagement with the outer, cylindrical surface of the mandrel. To facilitate this winding step, the inner surface of the liner ply 14 may be precoated with a slip coating having a low coefficient of friction. Such coatings are known in the art.

Because of the nature of the winding action, the leading unfolded, marginal edge portion 48 of the liner ply 14, as it reaches the mandrel 26, engages the outer surface of the hemmed trailing edge of the previously wound convolution of the combined plies 14, 16. As a result, the inner portion of the marginal edge portion 48 is pressed outwardly across the adjacent leading edge of the inner body ply 16, and the outer portion of the marginal edge portion 48 is offset into outwardly disposed helical alignment with the hem 51 and is adhesively secured to the hem 51 by the adhesive 54 to thus form a leakproof lap seam 58 which is positioned outwardly of the inner main body ply 16 (see FIG. 2). It will be noted that because of the interposition of the impervious adhesive 54 between the mutually facing foil layers of the lap seam 58, the raw edges of the pervious kraft backing layer 42 of the liner ply 14 are shielded from the product and only the impervious foil layer 40 of the liner ply 14 is exposed to the product within the container. Thus, penetration of the product into the container body is effectively prevented.

After this winding and seaming operation has been completed, the inner surface of the outer body ply 18 is coated with a suitable adhesive 59 and is butt wound onto the mandrel 26 over the inner body ply 16, the ply 18 being longitudinally offset relative to the ply 16 so that its butt joint 60 is offset from the lap seam 58 in order to provide a strong body structure. The partially formed tube 30 is then passed beneath the belt 32. After the tube 30 emerges from the belt 32, the label ply 20 is wrapped around its outer surface. The label ply 20 preferably comprises an outer aluminum foil layer 62 which is prelaminated to an inner kraft paper backing 64, the foil layer 62 providing a protective surface which inhibits deterioration of the body 12 in the event it is exposed to rain or moisture during shipment or storage. A suitable adhesive (not shown) is applied to the inner surface of the label ply 20 prior to the time it is wound onto the tube 30, and its edge portions are preferably overlapped to form a lap seam 66.

The label ply 20 may be preprinted with individual label patterns (not shown) which are disposed between the lines of severance 31 and are printed at an angle to the edges of the label ply 20 so that after completion of the tube 30, the label patterns extend around the tube and form complete unitary body labels, one of which is carried by each container body 12.

After application of the label ply 20, the finished tube 30 moves off the free end of the mandrel 26 and is cut along the lines of severance 31 to divide it into individual can bodies 12, each of which bears a complete body label.

It will be obvious that all of the mutually engaging surfaces of the various container plies will be adhesively secured together by the various adhesives which are applied to them. However, for the sake of clarity of illustration, only the adhesive 54 which is a vital and necessary component of the offset lap seam 58 is illustrated in FIG. 2. It will also be obvious that some variations in the method of incorporating the necessary adhesives in the tube 30 are possible. As examples, the adhesive 44 may be applied to the inner surface of the inner body ply 16 rather than to the outer surface of the liner ply 14, and the adhesive 54 may be applied to the inner surface of the outer portion of the leading marginal edge portion 48 of the liner ply, rather than to the hem 51.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

A fluid-tight container body for holding a fluid product, said body comprising
- a helical fibrous body ply having its helical edges disposed in slightly spaced relationship,
- a helical liner ply of greater width than said body ply,
- said liner ply comprising an inner layer of foil which is impervious to said fluid product and a paper backing layer which is pervious to said fluid product,
- said liner ply completely covering the inner surface of said body ply and having its opposite marginal edge portions extending outwardly between the spaced helical edges of said body ply and then folded into overlapping and mutually co-extensive relationship against the outer surface of said body ply to form a lap seam wherein the impervious layer of said opposite marginal edge portions are disposed in face to face relationship,
- and a product thermoplastic adhesive interposed between said mutually facing and co-extending impervious layers of said lap seam to seal the same and prevent access of said fluid product to said paper backing layer and said fibrous body ply.

References Cited in the file of this patent

UNITED STATES PATENTS

| | | |
|---|---|---|
| 1,885,587 | Barton | Nov. 1, 1932 |
| 1,973,317 | Hurley | Sept. 11, 1934 |
| 2,002,218 | McCall | July 16, 1935 |
| 2,377,358 | Moore et al. | June 5, 1945 |
| 2,406,758 | Gazette | Sept. 3, 1946 |
| 2,555,380 | Stuart et al. | June 5, 1951 |
| 2,605,514 | Eshenaur | Aug. 5, 1952 |
| 2,877,150 | Wilson | Mar. 10, 1959 |
| 2,891,714 | Vallas | June 23, 1959 |
| 2,943,540 | McBain | July 5, 1960 |
| 2,982,457 | D'alelio | May 2, 1961 |